United States Patent [19]
Iwata et al.

[11] Patent Number: 5,903,079
[45] Date of Patent: May 11, 1999

[54] ROTOR OF ROTATING EQUIPMENT

[75] Inventors: Masao Iwata, Yokosuka; Yoshiki Kitamura, Yokohama; Shigeru Ohtake, Yokosuka, all of Japan

[73] Assignee: Oppama Industry Co. Ltd., Kanagawa-ken, Japan

[21] Appl. No.: 08/993,571

[22] Filed: Dec. 18, 1997

[30] Foreign Application Priority Data

Jan. 7, 1997 [JP] Japan ................................. 9-012071

[51] Int. Cl.⁶ .................................................... H02K 21/38

[52] U.S. Cl. .............................. 310/156; 310/43; 310/51; 310/153

[58] Field of Search .............................. 310/156, 43, 153

[56] References Cited

U.S. PATENT DOCUMENTS 4,710,659  12/1987  Takano et al. ........................... 310/153

*Primary Examiner*—Nestor Ramirez
*Assistant Examiner*—Thanh Lam
*Attorney, Agent, or Firm*—Michael D. Bednarek; Crowell & Moring LLP

[57] ABSTRACT

A rotor core is provided with a pole piece portion holding a magnet and a balance weight portion, wherein said hub fitting hole is inserted a metal hub having a tapered axis hole and part fitting portion so as to be fixed each other, and said rotor core is coated with synthetic resins, thereby the use of metal can be limited only to parts where mechanical strength is required so that the whole rotor weight can be reduced and can be assembled easily, and be allow various parts can be fitted stably, and the degradation of magnetic properties of the magnet can be prevented.

11 Claims, 1 Drawing Sheet

5,903,079

ROTOR OF ROTATING EQUIPMENT

BACKGROUND OF THE INVENTION

The present invention relates to a rotor of a magneto and the like to be used for ignition equipment of an internal combustion engine and more particularly to a rotor the core of which has a metal hub to be used for fitting a rotating axis such as a crankshaft.

Prior Art

The conventional rotor of rotating equipment such as a magneto consists of a rotor core incorporating a pole piece portion holding a magnet and a balance weight portion, into which a hub is integrated as well. Also, said rotor is so constructed that, by injecting melt aluminum into a die wherein said rotor core is set, said hub made from an aluminum die cast which is used to connect a rotating axis such as a crankshaft is integrally molded into said rotor core.

Such a rotor equipped with a hub made of an aluminum die cast has a tapered axis hole portion to ensure easy and firm attachment of a rotating axis such as a crankshaft to said hub. The length of the taper axis hole in relation to thickness of the laminated rotor core and/or the position in the axial direction are arbitrarily set so that desired strength is obtained. Moreover, as said hub is made of an aluminum die cast, the hub can be provided with a faucet joint portion at its the circumference area through a cutting process to attach a cooling fan or a screw hole is formed to be used for attaching various parts such as a ratchet nail for recoiling. Therefore, this hub is capable of enough firmly supporting such a heavy cooling fan or ratchet nails which receive a large load stress. However, because such a conventional rotor of rotating equipment comprises laminated cores and aluminum die cast products in an integrated form and furthermore aluminum casting for the hub is carried out with a magnet being inserted into the pole piece portion, the rotor core, when the hub is molded, is made heavier in weight and molding of the hub becomes troublesome, as a result, causing less productivity and high casting cost. Additionally, there has been a problem that, due to a decrease in magnetic property of said magnet caused by heat generated through casting process of the hub, a process of magnetization of the magnet is required again after the aluminum die casting, resulting in a large increase in product costs. On the other hand, in recent years, there have emerged needs of users for large reduction in product costs and achievement of the light weight and, therefore, molding of a hub to be used for a rotor core has been attempted using synthetic resins instead of aluminum die casts. There has been, however, another problem that such synthetic resins are useless when the strength in supporting a rotating axis is to be obtained by lengthening said tapered axis hole more than the laminated layer of the rotor core and by deviating the position of said tapered axis hole in the direction of the axis. In addition, if screwing processing for fitting various heavy parts is given to such synthetic resins or attachment of the faucet joint portion to which a cooling fan and the like are fitted thereto, it causes a problem in terms of strength in the same way as described above and it is not realistic as well.

SUMMARY OF THE INVENTION

The present invention has been made to solve said problems in the conventional methods, and the object of the present invention is to provide a rotor of rotating equipment which can achieve the light weight of and can fully protect the rotor core by limiting the use of metal components only to places where mechanical strength is specifically required and by coating other portions of the rotor core with synthetic resins.

Another object of the present invention is to provide a rotor of rotating equipment wherein various parts can be easily attached to a hub fitted to the rotor core and wherein reduction of magnetic force of a magnet at a pole piece portion is avoided and reduction in production and product costs and the light weight of the rotor can be achieved.

A rotor of rotating equipment defined in claim 1 is a rotor core having a pole piece portion holding a magnet and a balance weight portion, both of which are disposed opposite to each other and which a hub fitting hole is located between them, a metal hub to be used for attaching a rotating axis and having a tapered axis hole at the center position of the hub and a part fitting portion, which is inserted and fixed in the hub fitting hole, and portions coated with synthetic resins which can cover at least said rotor equipped with the metal hub. In the rotor of rotating equipment defined in claim 1, by inserting a metal hub such as an aluminum hub into the hub fitting hole of the rotor core and fixing it therein, thermal and/or mechanical load imposed on the rotor core is avoided to prevent the degradation of quality and characteristics of the magnet at the pole piece portion, and also by inserting a crankshaft, by pressure, into the tapered axis hole of the aluminum hub, easy attachment of the rotor core is made possible and, furthermore, by coating the rotor core with synthetic resins, mechanical, electrical and chemical durability of the rotor can be improved.

In the rotor of the rotating equipment defined in claim 2, said part fitting portion is placed at a faucet joint portion formed in the circumstance of said metal hub. The rotor of the rotating equipment defined in claim 2 uses the faucet joint portion of the metal hub as a fitting site for a hub fitting hole of the rotor core and for various parts such as a ratchet nail. In the rotor of the rotating equipment defined in claim 3, said part fitting portion is used as a screw fitting portion for the fitting of parts. The rotor of the rotating equipment defined in claim 3 uses the screw fitting portion for attachment of parts to enable screwing various parts including the ratchet nail, thereby achieving firm and easy attachment of parts thereto. In the rotor of the rotating equipment defined in claim 4, said metal hub comprises aluminum die cast products. The rotor of the rotating equipment defined in claim 4, because its hub comprises aluminum die cast products, allows firm and reliable fixing of the rotor by screwing or inserting, by pressure, the cooling fan or by drilling or using a fastening tool.

DETAILED DESCRIPTION OF THE INVENTION

Figure 1:
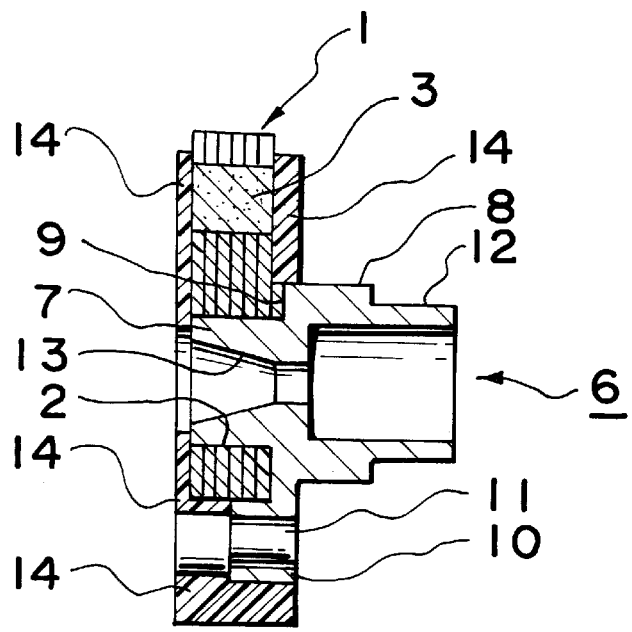
FIG. 1 is a sectional view of a rotor of rotating equipment according to one of embodiments of the present invention, taken along line A—A in FIG. 2.
Figure 2:
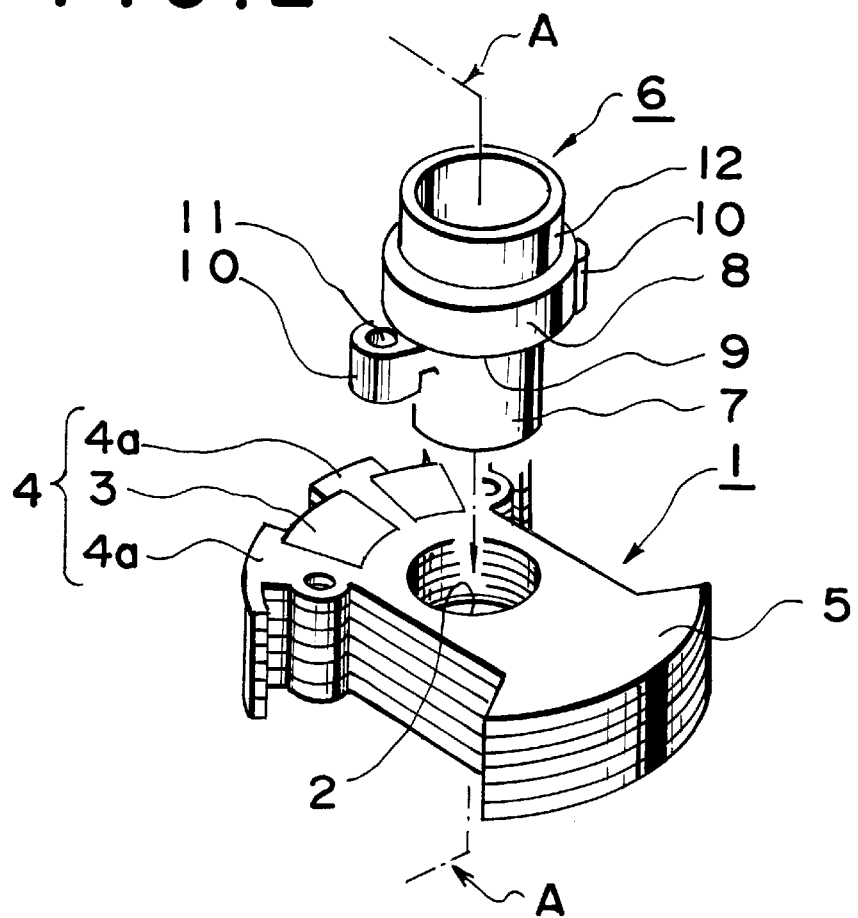
FIG. 2 is a perspective view of the rotor shown in FIG. 1, illustrating a state of assembly thereof.

One of embodiments of the prevent invention will be hereinafter described with reference to the attached drawings. FIG. 1 shows a rotor of rotating equipment in accordance with the present invention and FIG. 2 is a perspective view illustrating a state of assembly thereof. The reference numeral 1 in these drawings is a rotor core. The rotor core 1 partially constitutes the rotor of a magneto to be used for an ignition system of an internal combustion engine. The rotor core 1 comprises a plurality of laminated magnetic plates incorporated together by being riveted, molded parts of sintered magnetic alloy, etc. The rotor core 1 is I-shaped as a whole and so configured that a pole piece portion 4 having a magnet 3 is disposed opposite to a balance weight portion 5, with a hub fitting hole 2, to be described later in detail, placed between them. Said pole piece portion 4 has a pair of approximately T-shaped magnetic poles 4a which protrudes in a manner that these poles hold said magnet 3 between them at one end of the rotor core 1. Said magnet 3 is supported and fixed at a recessed area of the magnetic poles 4a. The reference numeral 6 is an aluminum hub to serve as a metal hub which has been molded through aluminum die casting process, independently from the rotor core 1. The faucet joint portion 7 constituting an end of the aluminum hub 6 and having a smaller diameter than that of the hub 6 is inserted, in the direction of the arrow in FIG. 2, by pressure into the hub fitting hole 2 of said rotor core 1, all of which is united together as a whole as shown in FIG. 1.

Also, the aluminum hub 6 has a circular flat area 9 and a portion 8 with a larger diameter, both being connected to said faucet joint portion 7 and being directly contacted with the circumference area of the hub fitting hole 2. As shown in FIG. 1, the circular flat area 9 is directly contacted with the circumference area of the hub fitting hole 2 of said rotor core 1.

The reference number 10 is a portion to which a screw is fixed which protrudes so that it is connected to said portion 8 with a larger diameter and which also serves as a portion where parts are fitted thereto. The screw fitting portion 10 has a length which is equal to half the thickness of said rotor core 1 where a screw hole 11 is formed. The screw hole 11 is formed in parallel to a center line of the aluminum hub. The reference number 12 is a faucet portion serving as a portion to which parts are fitted, which is placed in the circumference of another end of the aluminum hub and which is seen, in FIG. 2, in the lower part of the aluminum hub. For example, to the faucet portion 12, a cooling fan is fitted. Moreover, to said screw fitting portion 10, for example, a ratchet nail for a recoil starter is fixed by using a screw.

The reference numeral 13 is a tapered axis hole formed at a center position corresponding to said faucet joint portion 7. For example, into this axis hole 13, a crankshaft of an internal combustion engine to be used as a rotating axis of a generator may be inserted by pressure.

By inserting the faucet joint portion 7 of the aluminum hub 6 into the hub fitting hole 2 in such a manner that the lower face of said screw fitting portion 10 mounted on the aluminum hub 6 contacts the side face of the rotor core 1 and subsequently, in a mold die, by forming a synthetic resin coat 14 on the outer surface of the rotor core 1 except the outer surface of the aluminum hub 6, using injection molding, for example, an approximately circular plate-shaped rotor having excellent insulation, water-resistance and weather-resistance can be fabricated.

That is, in accordance with the embodiment of the present invention, a rotor having high strength, light-weight property and easiness of its production can be constructed by inserting, by pressure, an aluminum hub 6 produced through aluminum die casting process independently from the production of the rotor core 1, into the rotor core 1. Therefore, this makes it possible that various parts with weight being higher than that specified can be fitted to the aluminum hub 6. Additionally, by supplying the rotor core 1 with coating with synthetic resins 14 having a sufficient thickness, mechanical, electrical and chemical durability of the rotor can be improved. The rotor of the present invention can meet the requirement for reducing costs from a product manufacturer, In the process of coating with said synthetic resins 14, the magnet 3 is exposed to high temperature. However, because the temperature is extremely lower than that used at the time of injection of conventional aluminum die casting, reduction in the magnetic force of the magnet 3 does not occur. Thus, magnetization following molding is not required, thereby preventing degradation of quality and properties or increases in costs.

Thus, in the rotor of the present invention, the part fitting portion which must be metal is united as a whole on the aluminum hub 6 using the aluminum die casting. On the other hand, the rotor core 1 comprising laminated core is coated with synthetic resins 14. This provides protection of the rotor core itself and its lightweight feature.

The selection of the length and/or position of the tapered portion of said tapered axis hole 13 or screw working can be performed arbitrarily or easily on the aluminum hub 6 independently from the production of the rotor core 1. The occurrence of looseness in fitting or positional deviation of the aluminum hub 6 in relation to the rotor core 1 can be prevented, thus providing a rotor having high reliability at lower costs.

According to the present invention, as described above, by limiting the use of metal parts only to the area where mechanical strength is specifically required in the rotor core and by coating other parts of the rotor core with synthetic resins rotor, the rotor is successfully made lightweight as well as sufficiently protected. Furthermore, in the present invention, the reduction of the magnetic force of the magnet at the pole piece portion can be prevented and fitting of various parts to the metal hub can be easily made. As a result, the reduction of product prices/production costs and lightweight construction of the whole rotor can be realized.

What is claimed is:

1. A rotor of rotating equipment comprising:
    a rotor core having a hub fitting hole;
    a metal hub having a hole for receiving a rotating shaft, said metal hub being inserted in said hub fitting hole and fixed to said rotor;
    a part fitting portion formed on said metal hub, said part fitting portion having a hole for receiving a part; and
    a synthetic resin coat covering at least said rotor core.

2. The rotor of rotating equipment of claim 1 wherein said part fitting portion extends along said rotating shaft.

3. The rotor of rotating equipment of claim 2 wherein said part fitting portion has a length equal to half the thickness of said rotor core.

4. The rotor of rotating equipment of claim 2 wherein said part fitting portion is a part receiving hole that extends in parallel to said rotating shaft.

5. The rotor of rotating equipment of claim 1 wherein said part fitting portion is a part receiving screw hole.

6. The rotor of rotating equipment of claim 2 where said part fitting portion is in contact with a side face of said rotor core.

7. The rotor of rotating equipment of claim 1 wherein said part that is received by the said part fitting portion is a ratchet nail pawl.

8. A rotor of rotating equipment comprising:
    a rotor core having a hub fitting hole;
    a metal hub having a hole for receiving a rotating shaft, said metal hub being inserted in said hub fitting hole and fixed to said rotor core;
    a faucet portion formed on said metal hub for fixing a part to the rotor; and
    a synthetic resin coat covering at least said rotor core.

9. The rotor of rotating equipment of claim 8 wherein said part that is fixed to the rotor is a fan.

10. A rotor of rotating equipment comprising:

a rotor core having a hub fitting hole;

a metal hub having a hole for receiving a rotating shaft, said metal hub being inserted in said hub fitting hole and fixed to said rotor core;

a first part fitting portion formed on said metal hub, said first part fitting portion having a hole for receiving a first part; and a second part fitting portion formed on said metal hub, said second part fitting portion having a circumference for receiving a second part; and a synthetic resin coat covering at least said rotor core.

11. A rotor of rotating equipment comprising:

a rotor core having a hub fitting hole;

a metal hub having a hole for receiving a rotating shaft, said metal hub being inserted in said hub fitting hole and fixed to said rotor core;

a pair of part fitting portions formed on said metal hub at opposite sides thereof, each part fitting portion having a hole for receiving a part; and a synthetic resin coat covering at least said rotor core.

* * * * *